United States Patent
Östberg

(10) Patent No.: US 6,850,505 B1
(45) Date of Patent: Feb. 1, 2005

(54) METHOD AND APPARATUS FOR DOPPLER FREQUENCY ESTIMATION

(75) Inventor: Christer Östberg, Staffanstorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/387,788

(22) Filed: Sep. 1, 1999

(51) Int. Cl.⁷ .......................... H04B 7/216; H04B 7/02; G06F 11/00
(52) U.S. Cl. ................ 370/335; 370/252; 370/342; 370/465; 375/148; 375/267; 455/103
(58) Field of Search ................ 370/232, 334, 370/335, 339, 340, 342, 276, 277, 310, 315–320, 331, 431, 441, 252, 282, 316, 465; 455/103, 504; 375/130, 148, 267, 227

(56) References Cited

U.S. PATENT DOCUMENTS

| | | | | |
|---|---|---|---|---|
| 4,914,699 A | * | 4/1990 | Dunn et al. | 380/34 |
| 5,577,068 A | * | 11/1996 | Bottomley et al. | 375/232 |
| 5,615,409 A | * | 3/1997 | Forssen et al. | 455/440 |
| 5,818,876 A | * | 10/1998 | Love | 375/341 |
| 5,995,572 A | * | 11/1999 | Dettmar | 375/368 |
| 6,067,315 A | * | 5/2000 | Sandin | 370/252 |
| 6,249,682 B1 | * | 6/2001 | Kubo et al. | 455/522 |
| 6,377,813 B1 | * | 4/2002 | Kansakoski et al. | 455/522 |
| 6,424,642 B1 | * | 7/2002 | Schmidl et al. | 370/342 |
| 6,470,000 B1 | * | 10/2002 | Burns et al. | 370/342 |
| 6,542,562 B1 | * | 4/2003 | Ostberg et al. | 375/350 |

FOREIGN PATENT DOCUMENTS

| | | | | |
|---|---|---|---|---|
| EP | 0 790 727 | | 8/1997 | |
| WO | WO199300777 | * | 1/1993 | H04Q/7/00 |
| WO | 94/18752 | | 8/1994 | |
| WO | WO 94/18752 | * | 8/1994 | H03D/1/00 |
| WO | WO 95/24086 | * | 9/1995 | |
| WO | 99/29046 | | 6/1999 | |
| WO | WO 99/29046 | * | 6/1999 | H04B/7/005 |

* cited by examiner

Primary Examiner—Afsar M. Qureshi
(74) Attorney, Agent, or Firm—Potomac Patent Group PLLC

(57) ABSTRACT

A channel estimate generator generates a plurality of channel estimates and a Doppler frequency estimator uses two or more channel estimates to generate a Doppler frequency estimate. The Doppler frequency estimator generates the Doppler frequency estimate by calculating the normalized distance between two consecutive channel estimates. A receiver uses the Doppler frequency estimate to either (1) adjust the receiver, (2) estimate the velocity of the receiver, (3) determine whether it is necessary to search for new paths, or (4) predict or track new paths. The receiver can use a moving average of Doppler frequency estimates or a weighted combination of Doppler frequency estimates from different paths of a received signal to calculate the Doppler frequency estimate.

21 Claims, 7 Drawing Sheets

METHOD AND APPARATUS FOR DOPPLER FREQUENCY ESTIMATION

BACKGROUND

The invention relates to Doppler frequency estimation, and more particularly, to receiving spread spectrum radio signals, such as digitally modulated signals in a Code Division Multiple Access (CDMA) mobile radio telephone system.

In a CDMA system, different users, base stations, and services are usually separated by unique spreading sequences/codes. The rate of the spreading code (usually referred to as the chip rate) is larger than the information symbol rate. The code rate divided by the information symbol rate is usually referred to as the spreading factor (sf). An information data stream is spread (or coded) by multiplying the information data stream with the spreading code. In a system where there are multiple users, coded signals can be added together to form a composite signal. A receiver can recover any one of the information data streams by correlating the composite signal with the conjugate of the corresponding spreading code.

In a mobile communications system, signals transmitted between base and mobile stations typically suffer from echo distortion or time dispersion (multipath delay). Multipath delay is caused by, for example, signal reflections from large buildings or nearby mountain ranges. The obstructions cause the signal to proceed to the receiver along not one, but many paths. The receiver receives a composite signal of multiple versions of the transmitted signal that have propagated along different paths (referred to as "rays"). In order to optimally detect the transmitted signal, a device known as a searcher finds the different rays, and another device known as a RAKE receiver "rakes" them together.

FIG. 1 is an illustration of an exemplary frame structure in a CDMA system. Frame 100 has multiple slots 101, 102, 103, 104, ..., 116. Each slot has a pilot portion 120 and a data portion 130. It will be evident to those skilled in the art that different CDMA systems may have different frame structures. In the example shown, the pilot portion 120 has four pilot symbols 121, 122, 123, and 124, and the data portion 130 has multiple data symbols 131, 132, 133, 134, ... n. The pilot symbols 121, 122, 123, and 124 can be used to find different rays. Because the pilot symbols are known at the receiver, the searcher can use a filter that is matched to the pilot symbols (a matched filter) to find the different paths. The output of the matched filter is usually referred to as the multipath profile (or the delay profile). Because the received signal contains multiple versions of the same signal, the delay profile contains more than one spike. The different spikes correspond to the different rays. As discussed more fully below, the pilot symbols 121, 122, 123, and 124 can also be used for channel estimation.

FIG. 2 is a schematic diagram of the searcher and RAKE receiver portions of a receiver. A transmitter (not shown) transmits a signal to receiver 200. Because the signal travels along multiple paths, received signal 201 contains multiple versions of the same signal. Searcher 300 uses a matched filter 310 and a peak detector 350 to find and select a set of strongest rays. Searcher 300 can use a second matched filter 320, a slot delay 330, and an accumulator 340 to search more than one slot of frame 100.

RAKE receiver 400 has six fingers 410, 420, 430, 440, 450, and 460. Each finger is a simple receiver that is configured to receive a different path of the signal 201. For example, finger 410 is configured to receive a path having a time delay of $td_1$. Fingers 420, 430, 440, 450, and 460 are configured to receive paths having time delays of $td_2$, $td_3$, $td_4$, $td_5$, and $td_6$, respectively. The outputs of fingers 410, 420, 430, 440, 450, and 460 are multiplied by individual weights to maximize the received signal-to-noise-and-interference ratio. The weighted outputs are then added by an accumulator 700. The output of accumulator 700 is fed to a detector 800.

Suppose searcher 300 finds a set of rays, but that receiver 200 is a mobile hand-held unit. As receiver 200 moves, these rays are no longer the best rays. If receiver 200 uses weak rays, the signal quality will decrease. The only way that receiver 200 can maintain the same signal quality is to request additional signal power from the base station. Additional signal power increases the amount of interference experienced by the other receivers. The overall interference is minimized when each receiver uses the least amount of signal power possible.

Searching for new rays is computationally complex. It is not only time-consuming, it also decreases the battery life of the receiver. The need to search for new paths (and the time delay of the new best paths) is largely dependent on the relative velocity of the receiver. If the receiver can determine the Doppler frequency of the mobile, the receiver can determine whether the mobile has moved and whether searching for new paths is necessary. The receiver can also use the Doppler frequency to track or predict new paths. While researchers have long recognized Doppler frequency as one of the phenomenons affecting the radio channel, these researchers have not developed an effective method for deriving the Doppler frequency from the received signal itself. There is a need for a simple and reliable way to determine the Doppler frequency of a mobile station.

SUMMARY

According to one aspect of the invention, a channel estimate generator generates a plurality of channel estimates and a Doppler frequency estimator uses two or more channel estimates to generate a Doppler frequency estimate.

According to another aspect of the invention, a Doppler frequency estimator generates a Doppler frequency estimate by calculating the normalized distance between two consecutive channel estimates.

According to another aspect of the invention, a receiver uses a Doppler frequency estimate to either (1) adjust the receiver, (2) estimate the velocity of the receiver, (3) determine whether it is necessary to search for new paths, or (4) predict or track new paths.

According to another aspect of the invention, the receiver uses a moving average of Doppler frequency estimates to either (1) adjust the receiver, (2) estimate the velocity of the receiver, (3) determine whether it is necessary to search for new paths, or (4) predict or track new paths.

According to another aspect of the invention, the receiver uses a weighted combination of Doppler frequency estimates from different paths of a received signal to either (1) adjust the receiver, (2) estimate the velocity of the receiver, (3) determine whether it is necessary to search for new paths, or (4) predict or track new paths.

An advantage of the invention is that the receiver can estimate the Doppler frequency from the received signal itself. Another advantage is that the need to operate the matched filter is reduced.

BRIEF DESCRIPTION OF THE DRAWINGS

The foregoing, and other objects, features, and advantages of the invention will be more readily understood upon reading the following detailed description in conjunction with the drawings in which.

DETAILED DESCRIPTION

In the following description, specific details such as particular names for circuits, circuit components, and transmission techniques are discussed in order to provide a better understanding of the invention. However, it will be apparent to those skilled in the art that the invention can be practiced in other embodiments that depart from these specific details. In other instances, detailed descriptions of well-known methods and circuits are omitted so as not to obscure the description of the invention with unnecessary detail.

Figure 1:
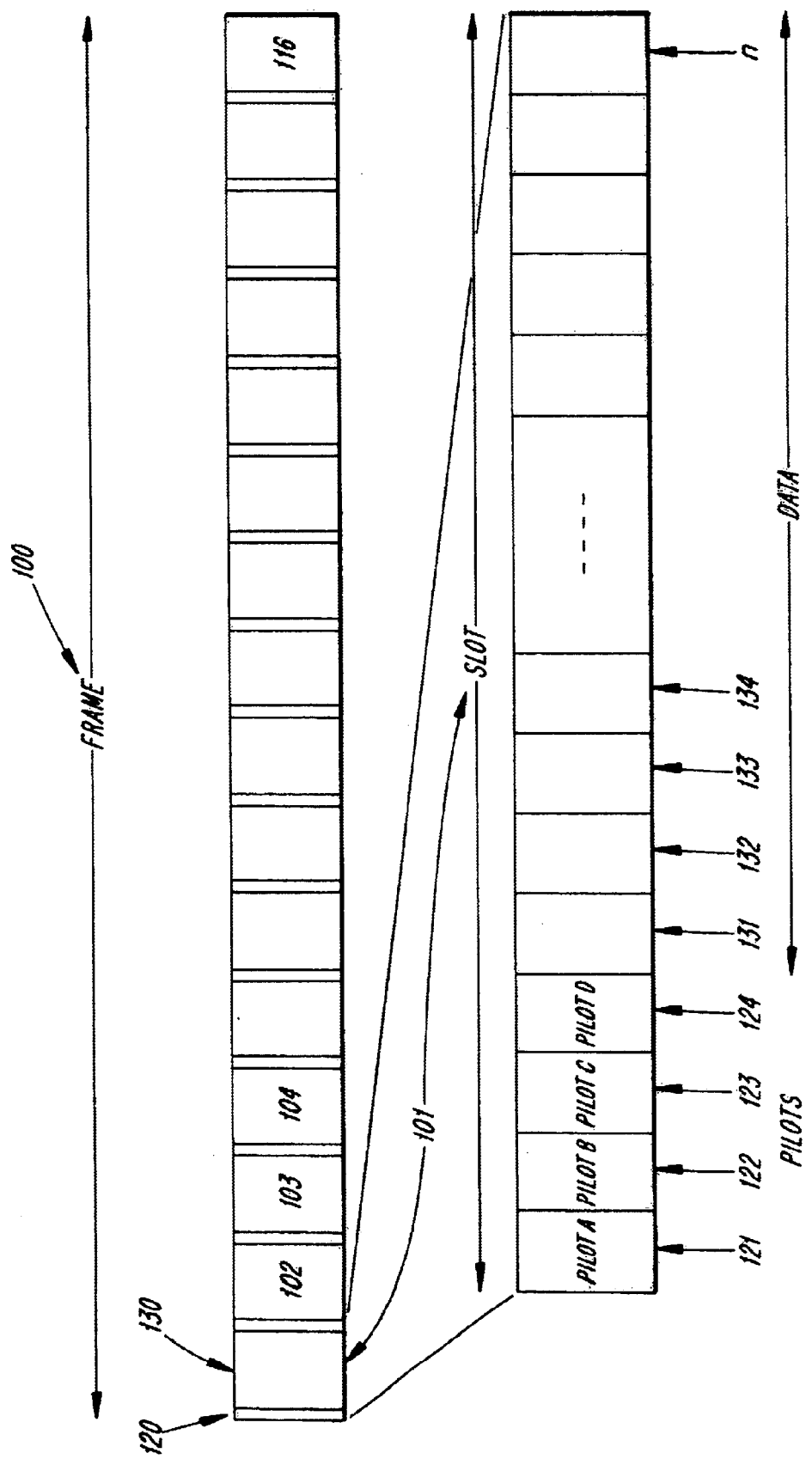
FIG. 1 is an illustration of an exemplary frame structure in a CDMA system.
Figure 2:
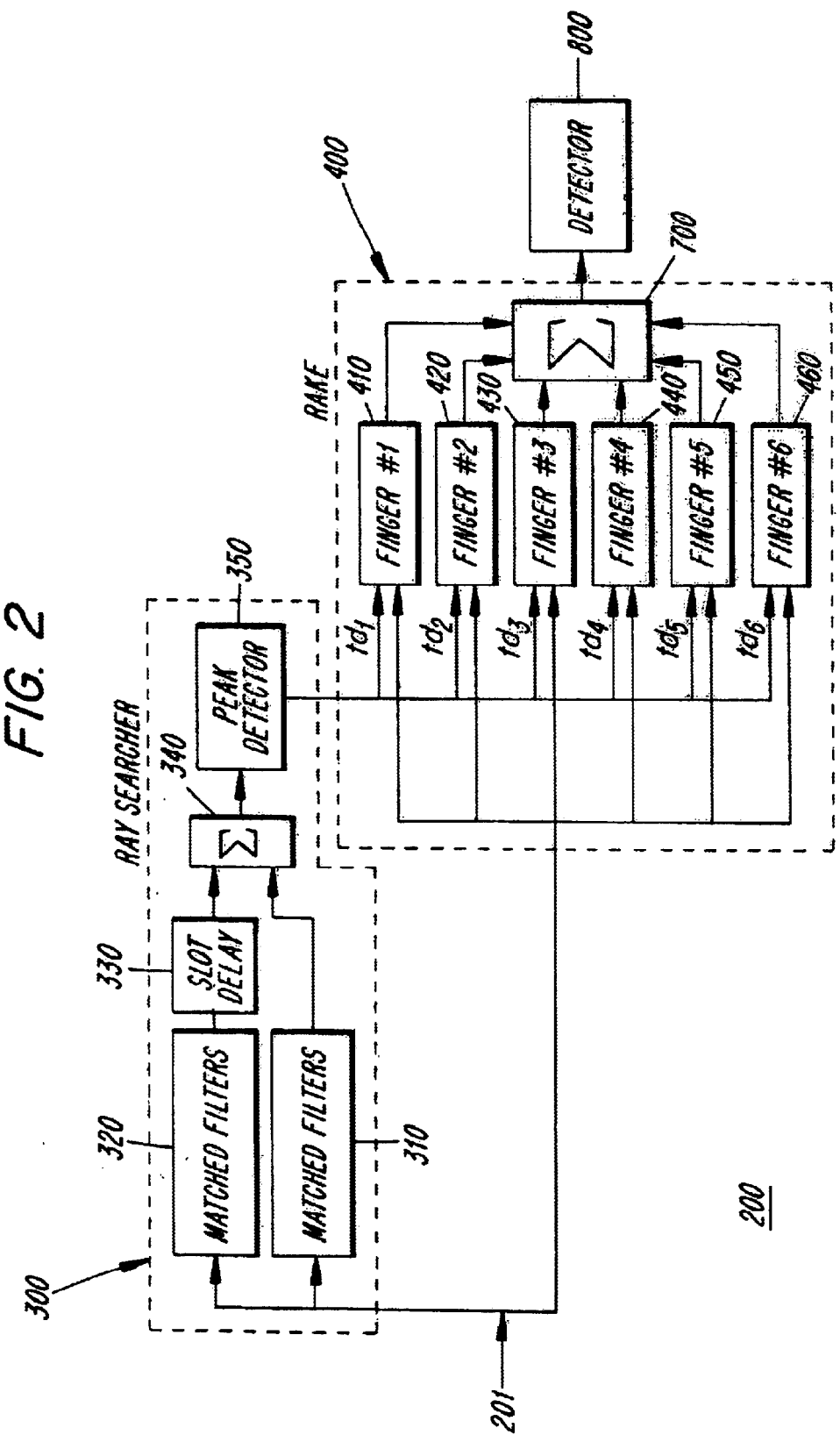
FIG. 2 is a schematic diagram of the searcher and RAKE receiver portions of a receiver.
Figure 3:
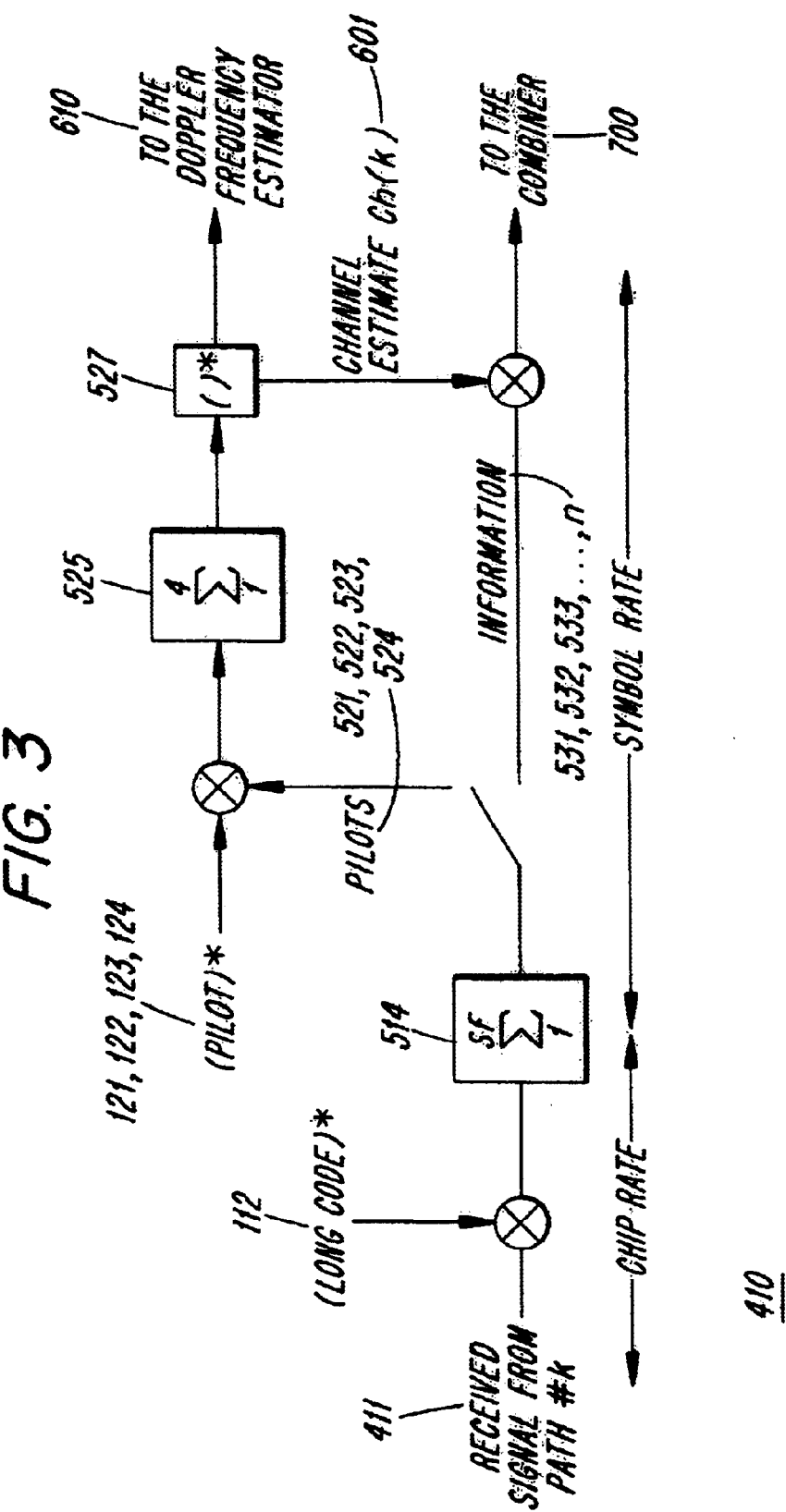
FIG. 3 is a schematic diagram of a RAKE finger.

As discussed above, FIG. 1 is an illustration of an exemplary frame structure in a CDMA system. FIG. 2 is a schematic diagram of the searcher and RAKE receiver portions of a receiver. FIG. 3 is a schematic diagram of a RAKE finger. As stated above, each finger is a simple receiver that is configured to receive a different path of signal 201. For example, finger 410 is configured to receive a signal from one of the paths 411. Finger 410 can be configured by either shifting the received signal 201 or the despreading code 112. In some CDMA systems, despreading code 112 is a long code that spans a large number of symbols. Long code 112 is used to separate, for example, different base stations. A short code is a code that spans a single symbol. A short code is used to separate, for example, different users in a particular cell. In FIG. 3, integrator 514 uses the short code to obtain individual symbols. The individual symbols are divided into pilot symbols 521, 522, 523, and 524 and information symbols 531, 532, 533, . . . , n.

A channel estimate is a measure of the channel's amplitude and phase distortion. In a RAKE receiver, the receiver has to generate channel estimates for each finger. The channel estimate in finger 410 is different from the channel estimate in, for example, finger 420 because finger 410 and finger 420 are configured to receive signals that traveled along different paths. The easiest way to generate channel estimate 601 is to compare pilot symbols 521, 522, 523, and 524 with the known pilot symbols 121, 122, 123, and 124. Because the channel corruption should be the same for pilots 121, 122, 123, and 124, combiner 525 can average the product of known pilot 121 with received pilot 521, known pilot 122 with received pilot 522, known pilot 123 with received pilot 523, and known pilot 124 with received pilot 524. Channel estimator 527 uses the average from combiner 525 to generate a channel estimate 601.

If information symbols 531, 532, 533, . . . , n are multiplied by channel estimate 601 or a filtered version thereof, it is possible to compensate for the channel distortion along path 411. The output of finger 410 is multiplied by an individual weight and is combined in accumulator 700. As discussed in more detail below, channel estimate 601 can also be used to generate a Doppler frequency estimate.

Figure 4:
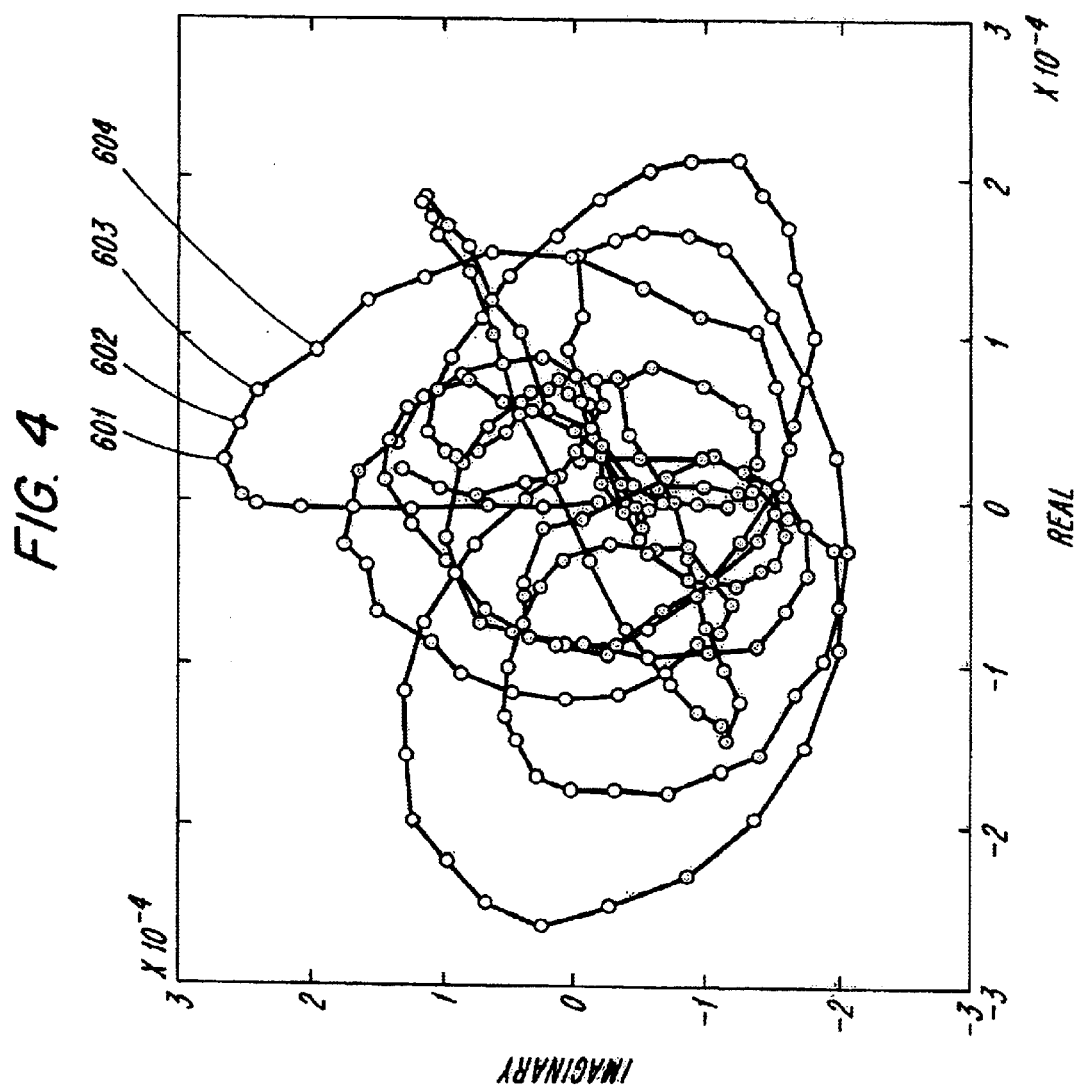
FIG. 4 is a graph of the amplitude and phase variation of consecutive channel estimates.

FIG. 4 is a graph of the amplitude and phase variation of consecutive channel estimates. The channel estimates are from, for example, one of the fingers 410, 420, 430, 440, 450, or 460. Consecutive channel estimates, which are shown as an asterisk, are connected by a line. The amplitude and phase variation of, for example, channel estimates 601, 602, 603, and 604 depends on (1) the Rayleigh distribution of the channel and (2) the Doppler frequency of the receiver. As discussed in more detail below, a Doppler frequency estimator can be configured to use two or more channel estimates to generate a Doppler frequency estimate.

Figure 5:
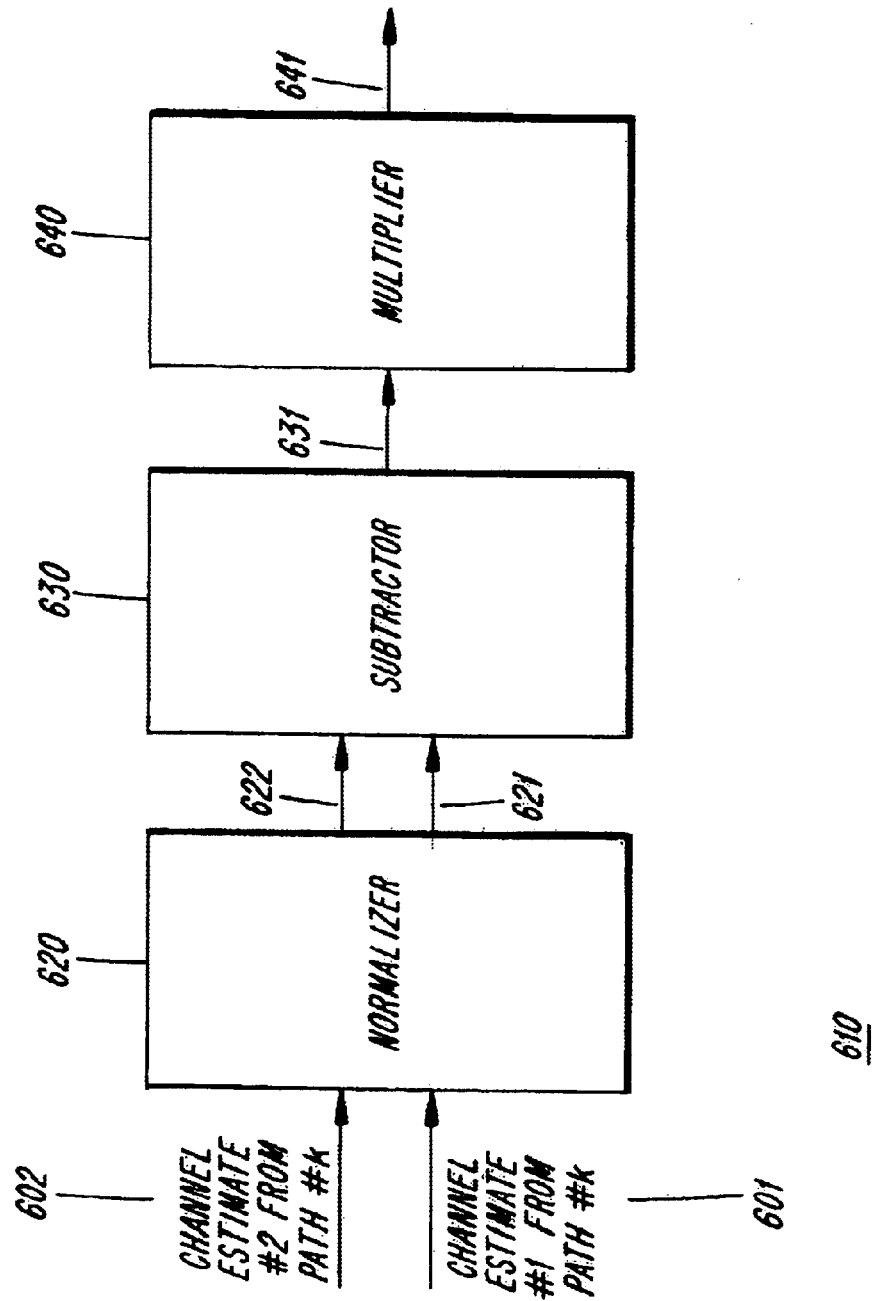
FIG. 5 is a schematic diagram of a Doppler frequency estimator.

FIG. 5 is a schematic diagram of a Doppler frequency estimator. Doppler frequency estimator 610 estimates the Doppler frequency by estimating the normalized distance between consecutive channel estimates. The normalization is made by dividing the complex channel estimates Ch(k) by the corresponding length.

$$Ch_n(k) = \frac{Ch(k)}{|Ch(k)|}$$

If the distance D(k) corresponds to the difference between two consecutive normalized complex channel estimates, $$D(k) = |Ch_n(k-1) - Ch_n(k)|$$

the current Doppler frequency, $f_D(k)$, is given by the following equation.

$$f_D(k) = 360 * D(k)$$

It will be evident to those skilled in the art that the speed of the mobile station can be found by solving the following equation, $$v(k) = \frac{\lambda * f_A(k)}{\cos\theta}$$

where λ is equal to the speed of light ($3*10^8$ m/s) divided by the carrier frequency of the signal ($f_c$) and θ is the angle between the signal and the direction of travel of the mobile station.

In FIG. 5, Doppler frequency estimator 610 uses channel estimates 601 and 602 to generate Doppler frequency estimate 641. A normalizer 620 divides channel estimates 601 and 602 by their corresponding lengths to generate normalized channel estimates 621 and 622. A subtractor 630 subtracts normalized channel estimate 622 from normalized channel estimate 621 to generate difference 631. A multiplier 640 multiplies difference 631 with a constant to generate Doppler frequency estimate 641. Doppler frequency estimate 641 can be used to (1) adjust the receiver, (2) estimate the velocity of the receiver, (3) determine whether it is necessary to search for new paths, and/or (4) predict or track new paths. Velocity estimator 680 uses Doppler frequency estimate 641 to generate velocity estimate 681.

If, for example, adjacent pilot symbols are used to generate more than one channel estimate, it is not necessary to use these consecutive channel estimates to generate a Doppler frequency. It is possible to average these consecutive channel estimates, and use an average from a subsequent group of adjacent pilot symbols to generate the Doppler frequency estimate. Channel estimate 601 may represent a channel estimate from a pilot symbol in slot 101 and channel estimate 602 may represent a channel estimate from slot 101 or slot 102. Or alternatively, channel estimate 601 may represent an average of consecutive channel estimates from slot 101, and channel estimate 602 may represent an average of consecutive channel estimates from slot 102.

Figure 6:
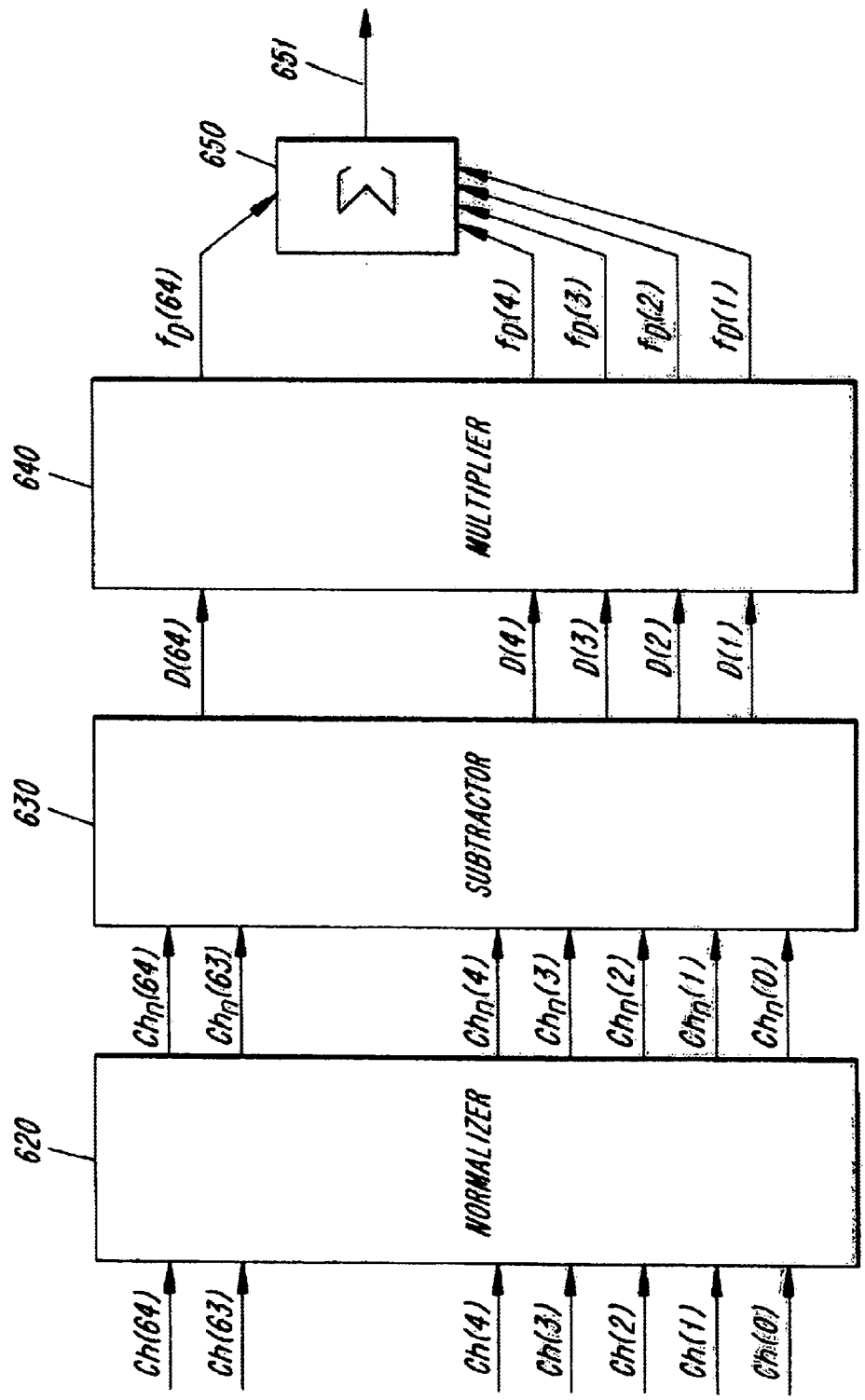
FIG. 6 is a schematic diagram of a Doppler frequency estimator.

FIG. 6 is a schematic diagram of a Doppler frequency estimator. When, for example, the mobile station is being used by a pedestrian, the change in the Doppler frequency can be quite slow. It may be advantageous in some cases to use a moving average of, for example, sixty-four channel estimates. In FIG. 6, a shift register or memory bank can be used to store a plurality of normalized channel estimates. Or alternatively, a shift register or a memory bank can be used to store a plurality of Doppler frequency estimates. A combiner 650 can sum and average the resulting channel estimates. Doppler frequency estimate 651 can be used to (1) adjust the receiver, (2) estimate the velocity of the receiver, (3) determine whether it is necessary to search for new paths, and/or (4) predict new paths.

Figure 7:
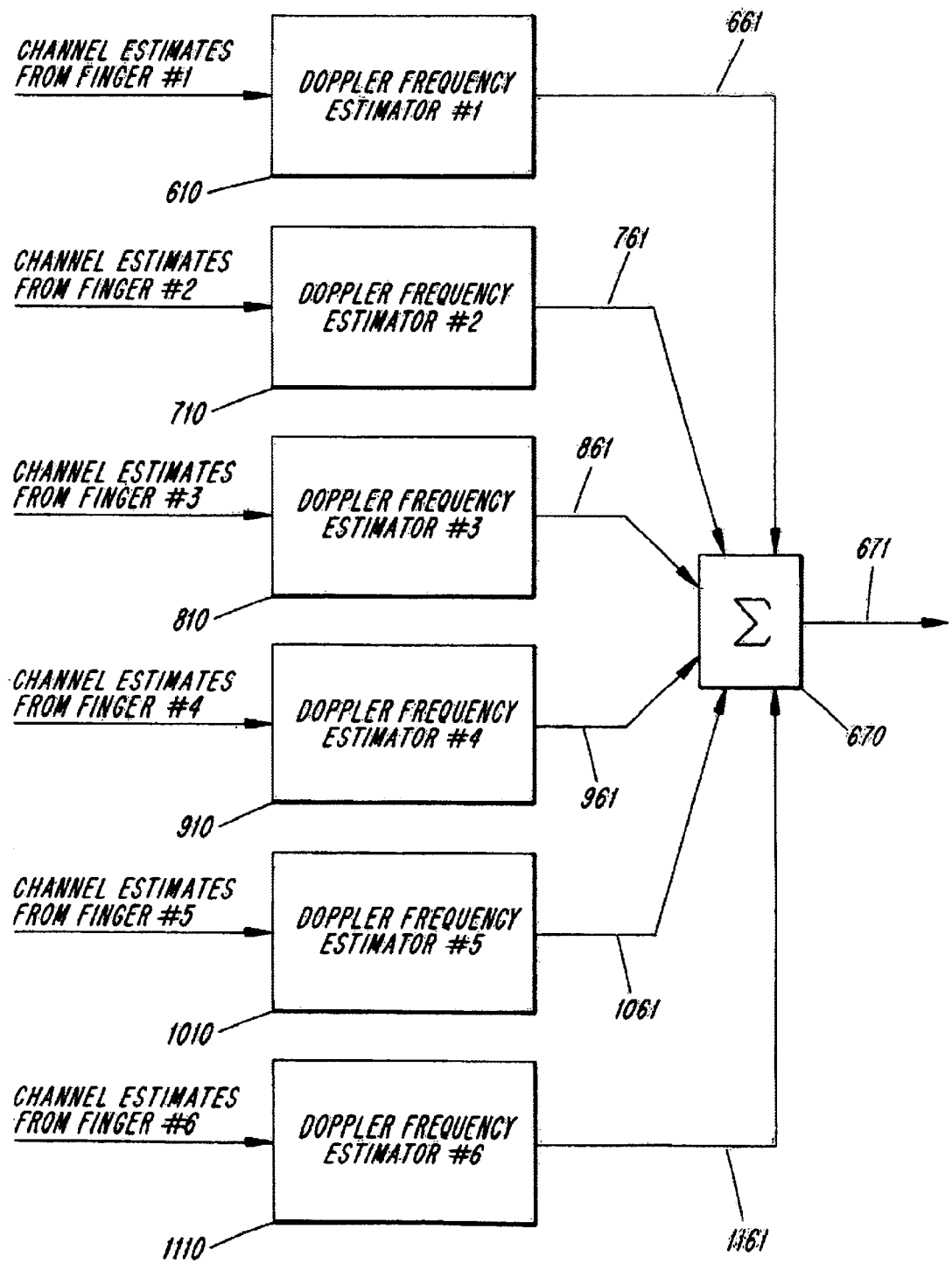
FIG. 7 is a schematic diagram of a Doppler frequency estimator.

FIG. 7 is a schematic diagram of a Doppler frequency estimator. Doppler frequency estimator 610 uses channel estimates from finger 410 to calculate Doppler frequency estimate 661. Doppler frequency estimators 710, 810, 910, 1010, 1110 use channel estimates from fingers 420, 430, 440, 450, and 460 to calculate Doppler frequency estimates 761, 861, 961, 1061, and 1161. Combiner 670 can generate a weighted combination of estimates 661, 761, 861, 961, 1061, and 1161. Doppler frequency estimate 671 can be used to (1) adjust the receiver, (2) estimate the velocity of the receiver, (3) determine whether it is necessary to search for new paths, and/or (4) predict new paths. In some cases, it may be advantageous to use only one finger to generate the Doppler frequency estimate. It may be advantageous to use only the strongest finger or one of the fingers other than the strongest finger. In other cases, it may be advantageous to combine some or all of the fingers. The optimum number of fingers, the weighting of the fingers, and whether to use a moving average in some or all of the fingers depends on, inter alia, the mobile station's environment, the distance between the mobile station and the base station, the speed of the mobile station, and the complexity of the receiver.

While the foregoing description makes reference to particular illustrative embodiments, these examples should not be construed as limitations. Not only can the inventive system be modified for other transmission techniques; it can also be modified for other cellular systems. Thus, the present invention is not limited to the disclosed embodiments, but is to be accorded the widest scope consistent with the claims below.

What is claimed is:

1. An apparatus for receiving a spread spectrum signal, the apparatus comprising:
   a plurality of fingers;
   a searcher, the searcher configured to find a path for each finger;
   a channel estimator, the channel estimator configured to generate a plurality of channel estimates for one of the fingers; and
   a Doppler frequency estimator comprising a normalizer, wherein the normalizer is configured to normalize at least two channel estimates, and the Doppler frequency estimator is configured to use two or more channel estimates from said one of the fingers to generate a Doppler frequency estimate.

2. An apparatus as described in claim 1, the Doppler frequency estimator further comprising a subtractor, the subtractor configured to calculate a difference between said at lest two normalized channel estimates.

3. An apparatus as described in claim 2, the Doppler frequency estimator further comprising a multiplier, the multiplier configured to multiply the difference with a constant.

4. An apparatus as described in claim 1, the normalizer configured to normalize at least two consecutive channel estimates.

5. An apparatus as described in claim 4, the Doppler frequency estimator further comprising a subtractor, the subtractor configured to calculate a difference between said at least two consecutive normalized channel estimates.

6. An apparatus as described in claim 5, the Doppler frequency estimator further comprising a subtractor, the subtractor configured to calculate a difference between said at least two consecutive normalized channel estimates.

7. An apparatus as described in claim 6, wherein Ch(k) and Ch(k−1) are consecutive channel estimates and the Doppler frequency estimate is given by the equation $$f_d(k) = 360 * \left| \frac{Ch(k-1)}{|Ch(k-1)|} - \frac{Ch(k)}{Ch(k)} \right|.$$

8. An apparatus as described in claim 1 the apparatus further comprising a velocity estimator, the velocity estimator configured to use the Doppler frequency estimate to generate a velocity estimate.

9. An apparatus as described in claim 1, the apparatus further comprising a combiner, the combiner configured to average a plurality of Doppler frequency estimates.

10. An apparatus as described in claim 9, the apparatus further comprising a velocity estimator, the velocity estimator configured to use the average to generate a velocity estimate.

11. An apparatus as described in claim 1, the channel estimate generator configured to receive a first group of pilot symbols.

12. An apparatus as described in claim 11, the channel estimate generator configured to receive a second group of pilot symbols, the second group of pilot symbols separated from the first group of pilot symbols by a group of information symbols.

13. An apparatus as described in claim 12, the Doppler frequency estimator configured to use a channel estimate from the first group of pilot symbols and a channel estimate from the second group of pilot symbols to generate the Doppler frequency estimate.

14. An apparatus ea described in claim 13, the Doppler frequency estimator configured to use an average of channel estimates from the first group of pilot symbols and an average of channel estimates from the second group of pilot symbols to generate the Doppler frequency estimate.

15. An apparatus as described in claim 1, wherein the Doppler frequency estimate is used to adjust at least one of the fingers.

16. An apparatus as described in claim 1, wherein the searcher uses the Doppler frequency estimate to determine whether to search for now paths.

17. An apparatus as described in claim 1, wherein the Doppler frequency estimate is used to predict the occurrence of new paths.

18. An apparatus as described in claim 1, wherein channel estimates from the strongest finger are used to generate the Doppler frequency estimate.

19. An apparatus as described in claim 1, wherein channel estimates from a finger other than the strongest finger are used to generate the Doppler frequency estimate.

20. An apparatus as described in claim 1, the apparatus further comprising a plurality of channel estimators and a plurality of Doppler frequency estimators, each Doppler frequency estimator configured to use two or more channel estimates from a different channel estimator to generate a Doppler frequency estimate.

21. An apparatus as described in claim 20, the apparatus further comprising a combiner, the combiner configured to calculate a weighted combination of Doppler frequency estimates from at least two of the Doppler frequency estimators.

* * * * *